United States Patent
Zhang et al.

(10) Patent No.: US 11,716,014 B2
(45) Date of Patent: Aug. 1, 2023

(54) METHOD FOR DETECTING EARLY DEGRADATION WITHIN THE INVERTER MODULE

(71) Applicant: GM GLOBAL TECHNOLOGY OPERATIONS LLC, Detroit, MI (US)

(72) Inventors: Jiyu Zhang, Sterling Heights, MI (US); Nomar S. Gonzalez Santini, Lakeland, FL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/562,504

(22) Filed: Dec. 27, 2021

(65) Prior Publication Data

US 2023/0208281 A1     Jun. 29, 2023

(51) Int. Cl.
*H02M 1/32* (2007.01)
*H02M 7/537* (2006.01)
*H02P 27/08* (2006.01)
*H02P 29/68* (2016.01)

(52) U.S. Cl.
CPC ........... *H02M 1/327* (2021.05); *H02M 7/537* (2013.01); *H02P 27/085* (2013.01); *H02P 29/68* (2016.02)

(58) Field of Classification Search
CPC ...... H02M 1/327; H02P 27/085; H02P 29/68; H02P 29/0088; H02P 29/0241
See application file for complete search history.

(56) References Cited

U.S. PATENT DOCUMENTS

| | | | | |
|---|---|---|---|---|
| 6,035,265 A * | 3/2000 | Dister | ................. | G01R 31/343 702/183 |
| 6,326,758 B1 * | 12/2001 | Discenzo | ........... | G05B 23/0283 388/906 |
| 7,301,296 B1 * | 11/2007 | Discenzo | ........... | G05B 19/4063 318/434 |
| 7,538,512 B2 * | 5/2009 | Discenzo | ........... | G05B 19/4063 318/609 |
| 8,380,451 B2 * | 2/2013 | Chen | ....................... | H02P 29/64 702/182 |
| 8,952,642 B2 * | 2/2015 | Ayano | ..................... | H02P 29/68 318/471 |

(Continued)

OTHER PUBLICATIONS

H. Huang and P. A. Mawby, "A Lifetime Estimation Technique for Voltage Source Inverters," in/IEEE Transactions on Power Electronics, vol. 28, No. 8, pp. 4113-4119, Aug. 2013, doi: 10.1109/TPEL.2012.2229472.

(Continued)

*Primary Examiner* — Yusef A Ahmed

(57) ABSTRACT

A diagnostic system for an inverter module includes a motor control module configured to determine operating characteristics of the inverter module. The operating characteristics include of at least one of a voltage, a current, and a switching frequency associated with operation of the inverter module. A diagnostic module is configured to receive the operating characteristics of the inverter module, estimate at least one junction temperature of a component of the inverter module based on the operating characteristics, calculate a health indicator of the inverter module based on the estimated junction temperature, and selectively output an alert based on the calculated health indicator.

11 Claims, 3 Drawing Sheets

(56) References Cited

U.S. PATENT DOCUMENTS

| | | | | |
|---|---|---|---|---|
| 8,957,723 | B2* | 2/2015 | Zoels | H03K 17/18 327/108 |
| 9,869,722 | B1* | 1/2018 | Morris | G01R 31/2849 |
| 11,025,157 | B2* | 6/2021 | Minesawa | G01K 7/00 |
| 2002/0131285 | A1* | 9/2002 | Kawakami | H02M 7/53875 363/132 |
| 2008/0048603 | A1* | 2/2008 | Discenzo | H02P 29/032 318/609 |
| 2009/0276165 | A1* | 11/2009 | Weiss | H02P 27/00 702/34 |
| 2010/0080024 | A1* | 4/2010 | Wei | H03K 17/0828 363/74 |
| 2010/0171456 | A1* | 7/2010 | Chakrabarti | H02M 7/53875 318/472 |
| 2011/0015881 | A1* | 1/2011 | Chen | H02P 29/64 702/58 |
| 2011/0025369 | A1* | 2/2011 | Quarto | G01R 31/343 324/765.01 |
| 2011/0031920 | A1* | 2/2011 | Henderson | H02P 21/0089 318/434 |
| 2012/0250385 | A1* | 10/2012 | Takihara | G01K 7/00 327/131 |
| 2012/0299387 | A1* | 11/2012 | Izadian | H01L 31/02021 307/97 |
| 2013/0015799 | A1* | 1/2013 | Ayano | B60L 3/003 318/430 |
| 2013/0107595 | A1* | 5/2013 | Gautier | H02M 1/08 363/124 |
| 2015/0377717 | A1* | 12/2015 | Rollin | G01K 7/01 318/400.26 |
| 2015/0381101 | A1* | 12/2015 | Odaka | H02P 29/68 318/472 |
| 2016/0373047 | A1* | 12/2016 | Loken | H02M 7/53875 |
| 2017/0003337 | A1* | 1/2017 | Bito | H03K 19/018507 |
| 2017/0131379 | A1* | 5/2017 | Omata | B60L 50/51 |
| 2017/0310252 | A1* | 10/2017 | Krah | H02P 6/14 |
| 2018/0226911 | A1* | 8/2018 | Yagi | H02P 29/68 |
| 2019/0066899 | A1* | 2/2019 | Sakamoto | H01F 27/10 |
| 2019/0250046 | A1* | 8/2019 | Sun | G01R 31/2619 |
| 2019/0383670 | A1* | 12/2019 | Sathik | H02P 29/60 |
| 2020/0371148 | A1* | 11/2020 | Scott | G06N 20/10 |
| 2021/0159831 | A1* | 5/2021 | Kallio | H02P 27/06 |
| 2021/0175826 | A1* | 6/2021 | Zhang | H02P 21/20 |
| 2021/0175835 | A1* | 6/2021 | Zhang | H02P 29/0241 |
| 2021/0313924 | A1* | 10/2021 | Yoo | H02M 1/0009 |
| 2021/0391820 | A1* | 12/2021 | Morris | H02P 29/0241 |
| 2022/0320973 | A1* | 10/2022 | Shinohara | H02K 9/223 |

OTHER PUBLICATIONS

C. Sintamarean, H. Wang, F. Blaabjerg and F. Iannuzzo, "The impact of gate-driver parameters variation and device degradation in the PV-inverter lifetime," 2014 IEEE Energy Conversion Congress and Exposition (ECCE), 2014, pp. 2257-2264, doi: 10.1109/ECCE.2014.6953704.

* cited by examiner

METHOD FOR DETECTING EARLY DEGRADATION WITHIN THE INVERTER MODULE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and, more particularly, to inverter modules for battery systems of electric and hybrid electric vehicles.

Some types of vehicles include only an internal combustion engine that generates propulsion torque. Pure electric vehicles include a battery system and an electric motor. Hybrid vehicles include both an internal combustion engine and one or more electric motors and may include a battery system. The battery system includes one or more batteries or battery modules. Each battery module includes one or more battery cells.

SUMMARY

A diagnostic system for an inverter module includes a motor control module configured to determine operating characteristics of the inverter module. The operating characteristics include of at least one of a voltage, a current, and a switching frequency associated with operation of the inverter module. A diagnostic module is configured to receive the operating characteristics of the inverter module, estimate at least one junction temperature of a component of the inverter module based on the operating characteristics, calculate a health indicator of the inverter module based on the estimated junction temperature, and selectively output an alert based on the calculated health indicator.

In other features, the diagnostic module is configured to estimate at least one of a transistor junction temperature and a diode junction temperature, and the at least one junction temperature includes the at least one of the estimated transistor junction temperature and the estimated diode junction temperature.

In other features, the diagnostic module is configured to calculate at least one of a conduction loss and a switching loss of the component of the inverter module based on the operating characteristics.

In other features, the diagnostic module is configured to calculate a power loss of the inverter module based on the at least one of the conduction loss and the switching loss.

In other features, the diagnostic module is configured to estimate the at least one junction temperature based on the calculated power loss.

In other features, the diagnostic module is configured to calculate the health indicator based on a comparison between the estimated junction temperature and a sensed temperature.

In other features, the diagnostic module is configured to calculate the health indicator based on a comparison between the estimated junction temperature and the sensed temperature.

In other features, the diagnostic module is configured to calculate the health indicator based on a linear relationship between the estimated junction temperature and the sensed temperature.

In other features, the diagnostic module is configured to calculate the health indicator based on the linear relationship and at least one threshold.

In other features, the diagnostic system is configured to selectively output an alert based on a value of the health indicator.

In other features, a vehicle includes the diagnostic system and further includes the inverter module and an electric motor.

A method for performing a diagnosis of an inverter module includes determining operating characteristics of the inverter module that include at least one of a voltage, a current, and a switching frequency associated with operation of the inverter module, estimating at least one junction temperature of a component of the inverter module based on the operating characteristics, calculating a health indicator of the inverter module based on the estimated junction temperature, and selectively outputting an alert based on the calculated health indicator.

In other features, the method further includes at least one of estimating a transistor junction temperature and estimating a diode junction temperature and the at least one junction temperature includes at least one of the estimated transistor junction temperature and the estimated diode junction temperature.

In other features, the method further includes calculating at least one of a conduction loss and a switching loss of the component of the inverter module based on the operating characteristics, calculating a power loss of the inverter module based on the at least one of the conduction loss and the switching loss, and estimating the at least one junction temperature based on the calculated power loss.

In other features, the method further includes calculating the health indicator based on a comparison between the estimated junction temperature and a sensed temperature.

In other features, the method further includes calculating the health indicator based on a linear relationship between the estimated junction temperature and the sensed temperature.

In other features, the method further includes calculating the health indicator based on the linear relationship and at least one threshold.

In other features, the method further includes selectively outputting the alert based on a value of the health indicator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Electric or hybrid electric vehicles typically include one or more rechargeable batteries or battery modules each including a plurality of battery cells (e.g., arranged in one or more battery packs). In some examples, an electric vehicle includes a high voltage (HV) battery system or pack configured to provide electrical power to an electric motor via an inverter or inverter module. For example, the inverter module is configured to convert DC electrical power from the battery system to AC electrical power to operate the electric motor.

Components of the inverter module may degrade over time. For example, thermal stress associated with high voltage operation may cause degradation of inverter components such as switches, temperature sensors, etc., leading to loss of propulsion and, eventually, failure of the inverter module.

Diagnostic systems and methods according to the present disclosure are configured to detect and/or predict degradation of components of the inverter module prior to failure and any loss of inverter module functionality.

Figure 1:
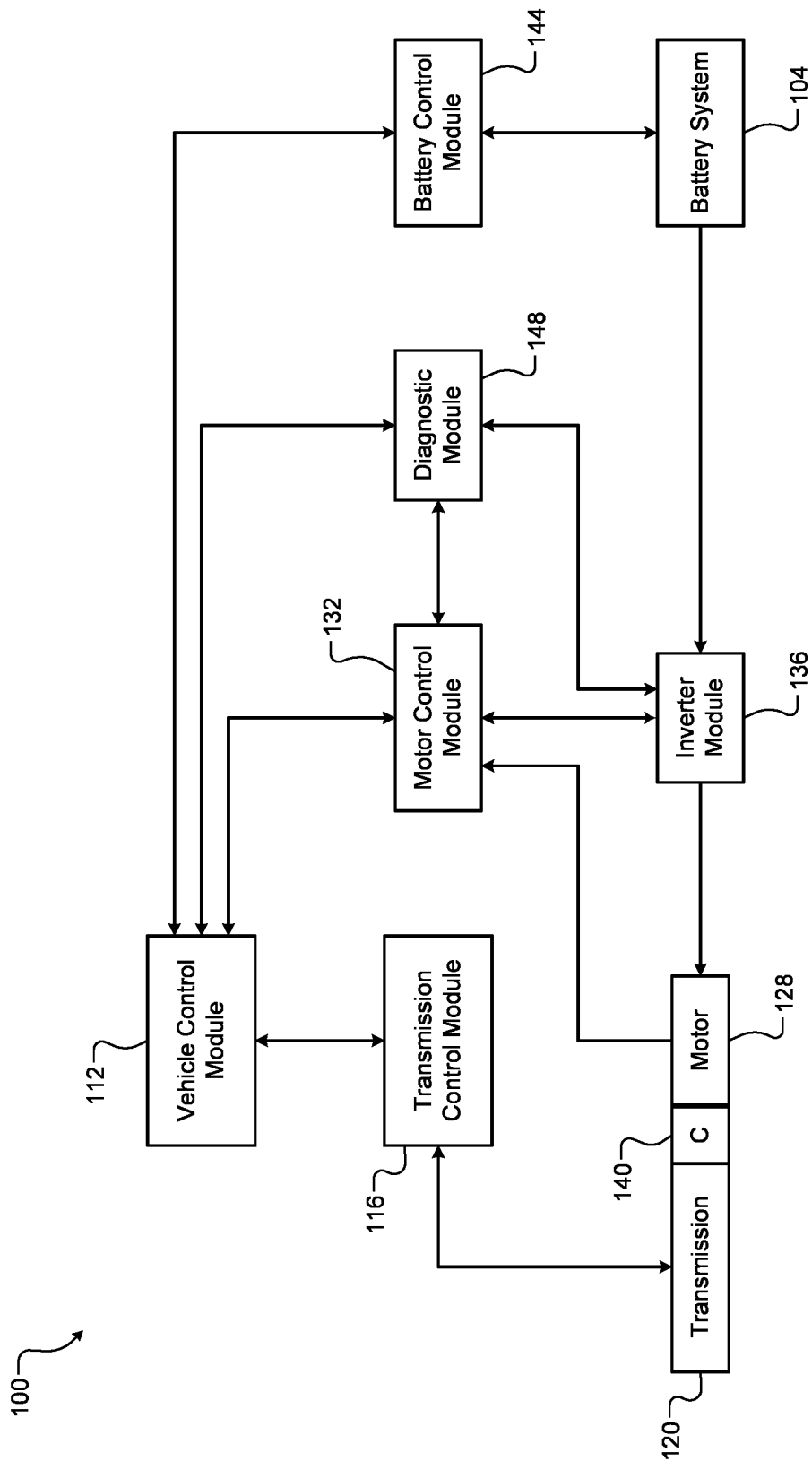
FIG. 1 is a functional block diagram of an example vehicle system according to the present disclosure.

Referring now to FIG. 1, a functional block diagram of an example vehicle system 100 according to the present disclosure is shown. The vehicle system 100 may correspond to an autonomous or non-autonomous vehicle. The vehicle may be an electric vehicle including a battery pack or system 104 (as shown). In other examples, the principles of the present disclosure may be implemented in a hybrid electric vehicle or a non-vehicle application.

A vehicle control module 112 controls various operations of the vehicle system 100. The vehicle control module 112 may communicate with a transmission control module 116, for example, to coordinate gear shifts in a transmission 120. The vehicle control module 112 may communicate with the battery system 104, for example, to coordinate operation of an electric motor 128. While the example of one electric motor is provided, multiple electric motors may be implemented. The electric motor 128 may be a permanent magnet electric motor or another suitable type of electric motor that outputs voltage based on back electromagnetic force (EMF) when free spinning, such as a direct current (DC) electric motor or a synchronous electric motor. In various implementations, various functions of the vehicle control module 112 and the transmission control module 116 may be integrated into one or more modules.

Electrical power is applied from the battery system 104 to the electric motor 128 to cause the electric motor 128 to output positive torque. For example, a motor control module 132 (e.g., responsive to the vehicle control module 112) may be configured to control an inverter module 136 to apply the electrical power from the battery system 104 to the electric motor 128. The electric motor 128 may output torque, for example, to an input shaft of the transmission 120, to an output shaft of the transmission 120, or to another component. A clutch 140 may be implemented to couple the electric motor 128 to the transmission 120 and to decouple the electric motor 128 from the transmission 120. One or more gearing devices may be implemented between an output of the electric motor 128 and an input of the transmission 120 to provide one or more predetermined gear ratios between rotation of the electric motor 128 and rotation of the input of the transmission 120.

A battery control module (comprising, for example, a vehicle or battery management system) 144 is configured to control functions of the battery system 104 including, but not limited to, controlling switching of individual battery modules or cells of the battery system 104, monitoring operating parameters, diagnosing faults, etc.

The vehicle system 100 according to the present disclosure includes a diagnostic module 148. The diagnostic module 148 may be separate from (as shown) or included within the motor control module 132, the vehicle control module 112, etc. The diagnostic module 148 is configured to detect and/or predict degradation of components of the inverter module 136 prior to failure and any loss of inverter module functionality as described below in more detail. For example, the diagnostic module 148 is configured to monitor operating characteristics of the inverter module 136 (e.g., measured, calculated, and/or modelled temperatures of various components of the inverter module 136) to diagnose and predict component degradation and faults.

Although described herein as being implemented at least partially within the diagnostic module 148, in other examples the principles of the present disclosure may be implemented within one or more other components of the vehicle system (e.g., the motor control module 132, the vehicle control module 112, etc.).

Figure 2:
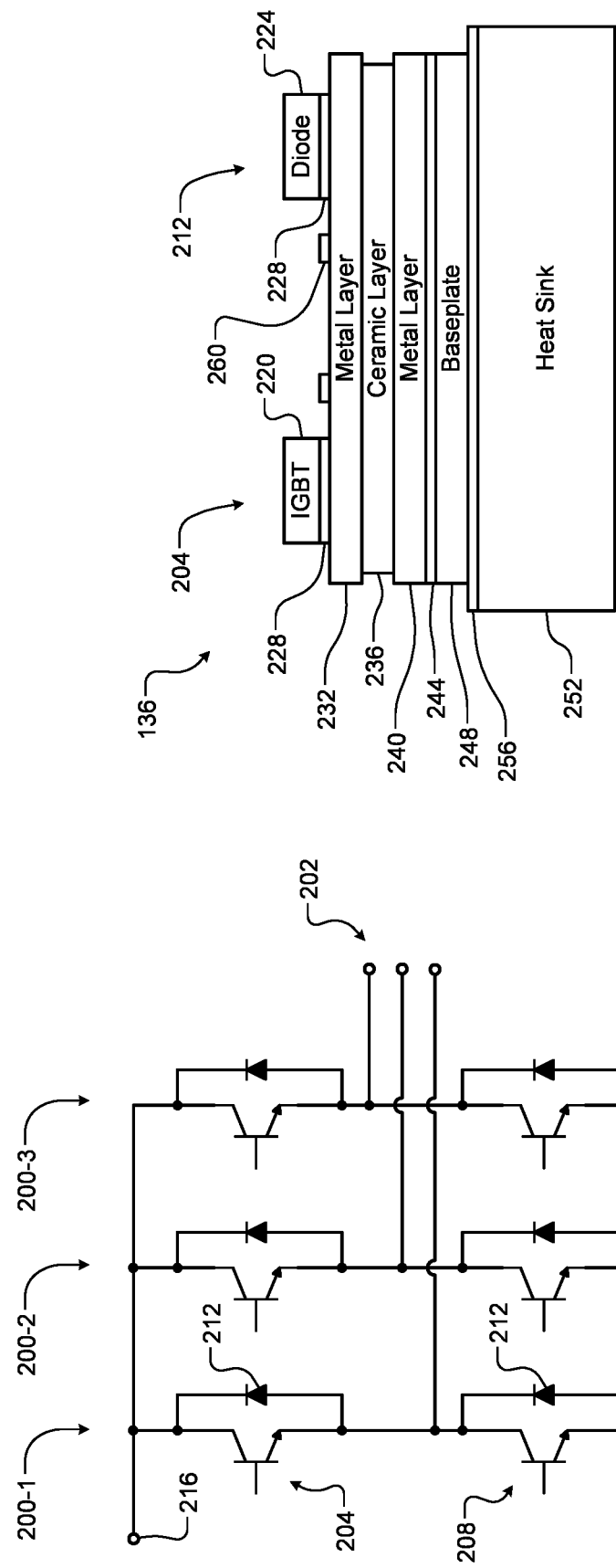
FIG. 2A is a schematic of an example inverter module according to the present disclosure.
FIG. 2B is an example integrated circuit implementation of the inverter module of FIG. 2A.

An example of the inverter module 136 is shown in FIGS. 2A and 2B. As shown in FIG. 2, a schematic implementation of the inverter module 136 includes three legs, 200-1, 200-2, and 200-3 (referred to collectively as legs 200). Each of the legs 200 is connected to a respective phase of the motor 128 (e.g., via output terminals 202). Each of the legs 200 includes a first switch 204 and a second switch 208. Each of the switches 204 and 208 is implemented as an insulated gate bipolar transistor (IGBT), a field effect transistor (FET), such as a metal oxide semiconductor FET (MOSFET), or another suitable type of switch. As shown, the switches 204 and 208 are implemented as IGBT transistors.

In some examples, each of the switches 204 and 208 is connected in an anti-parallel arrangement with respective diodes 212. In this arrangement, the diodes 212 function as rectifiers while power flows from the motor 128 to the battery system 104. In other examples, the switches 204 and 208 may not be connected in an anti-parallel arrangement with the diodes 212. For example, the switches 204 and 208 may be implemented as MOSFET transistors.

The switches 204 and 208 and the diodes 212 in each of the legs 200 form one phase of a three-phase rectifier for converting power from the battery system 104 (e.g., received via input terminals 216) into power to operate the motor 128. Each of the legs 200 provides power to a respective stator winding of the motor 128. For example, the motor control module 132 provides a switching signal to respective control (e.g., gate) terminals of the switches 204 and 208. In one example, the motor control module 132 generates the switching signals using pulse width modulation (PWM) control such that a high side switch (e.g., the switch 204) of respective one of the legs 200 is on while a low side switch (e.g., the switch 208) is off and vice versa. Gates of the low side switches may be inverted such that signals applied to the low side switches are opposite in polarity to signals applied to the high side switches.

FIG. 2B shows an example integrated circuit implementation of the inverter module 136. The inverter module 136 includes pairs of switches (e.g., the switch 204) and diodes (e.g., the diode 212) arranged on various package layers. For example, the switch 204 is implemented as an IGBT chip 220 and a diode chip 224 soldered (e.g., via solder joints 228) to a first metal layer 232. The first metal layer 232 is arranged on a ceramic layer 236 and the ceramic layer 236 is arranged on a second metal layer 240. The second metal layer 240 is soldered (e.g., via solder joint 244) to a baseplate 248. The baseplate 248 is arranged on a heat sink 252. A thermal paste layer 256 may be provided between the baseplate 248 and the heat sink 252 to facilitate heat transfer to the heat sink 252.

Physical and electrical connections between various components (e.g., the solder joints 228 between the IGBT chip 220 and the first metal layer 232 and between the diode chip 224 and the first metal layer 232, the solder joint 244, wire bonds, etc.) wear over time due to thermal stress and may eventually cause failure of the inverter module 136. For example, temperature variations and different coefficients of thermal expansion (CTEs) between the various layers of the inverter module 136 lead to mechanical stress of the solder joints 228 and 244, crack damage, and delamination. Similarly, high currents flowing through bond wires lead to self-heating, thermal expansion, deformation, mechanical stress, liftoff, crack damage, etc.

Wear and degradation as described above cause increased electrical and thermal resistance between components of the inverter module, which in turn lead to increased junction temperatures (e.g., an IGBT junction temperature $T_{j,igbt}$ and a diode junction temperature $T_{j,diode}$). Typically, respective resistance characteristics of the components is known (e.g., IGBT and diode junction resistances). Accordingly, for a known current, an expected temperature can be predicted. As resistance increases due to wear and degradation, junction temperatures will increase across a range of currents. In other words, for a current Ii, an expected junction temperature may be $T_1$. As resistance increases due to wear, the actual junction temperature (a junction temperature) for the same current I may be $T_{1+\Delta}$.

Accordingly, as the estimated junction temperature increases, resistances can be interpolated for various voltage and current values, and resistance is indicative of health (i.e., degradation) of the inverter module 136. Further, one or more temperature sensors (e.g. thermistors) 260 may also be provided proximate to respective ones of the IGBT chip 220 and the diode chip 224 to provide sensed or measured temperatures (e.g., a temperature of the IGBT chip 220, a temperature of the diode chip 224, temperatures of both the IGBT chip 200 and the diode chip 224, etc.). Typically, a relationship between the sensed temperatures and corresponding estimated junction temperatures is known. For example, the relationship between a sensed temperature and an estimated junction temperature for a corresponding chip may be a known linear relationship. In this manner, as the sensed temperature deviates from the expected relationship relative to the estimated junction temperature, a health indicator (i.e., as indicated by an increase in resistance) can be calculated.

A health indicator HI for a given device (e.g., the IGBT chip 220, the diode chip 224, etc.) can be calculated according to $HI=T_{junc}-CT_{therm}$, where $T_{junc}$ is an estimated junction temperature, $T_{therm}$ is a corresponding sensed temperature, and C is a constant (e.g., a predetermined calibrated value). In other words, the health indicator corresponds to change in a relationship (e.g., an expected linear relationship) between the estimated junction temperature and the sensed temperature. As the relationship increases (i.e., as the sensed temperature increases relative to the estimated (expected) junction temperature due to degradation of the inverter module 136), the health indicator changes accordingly.

As one example, the diagnostic module 148 according to the present disclosure is configured to calculate the estimated junction temperature $T_{junc}$ based on measured and/or sensed operating characteristics of the inverter module 136. For example, junction temperature may change based on inverter power loss (i.e., IGBT and diode power losses), which can be calculated based on current, voltage, and switching frequency of a given switch and diode pair. Accordingly, the diagnostic module 148 receives signals including, but not limited to, voltages (e.g., of each of the legs 200 of the inverter module 136), respective currents. Voltage drops and energy loss can be calculated based on the voltages and currents, and conduction loss and switching loss can then be calculated based on the voltage drops, energy loss, and switching frequency. In other examples, the junction temperature may be obtained using other inputs (e.g., using a lookup table based on a predetermined relationship between temperature and one or more operating characteristics).

Conduction loss and switching loss are further indicative of junction temperature. Accordingly, junction temperatures of the IGBT chip 220 and the diode chip 224 can be estimated based on the conduction loss. As one example, an estimated IGBT junction temperature $T_{j,igbt}$ is calculated according to $T_{j,igbt}=T_{cool}+C1*P_{diode}+C2*P_{igbt}$, where $T_{cool}$ is a coolant temperature, $P_{diode}$ corresponds to diode power loss (e.g., a sum of diode conduction loss and switching loss), $P_{igbt}$ corresponds to IGBT power loss (e.g., a sum of IGBT conduction loss and IGBT switching loss), and C1 and C2 are constants associated with thermal resistances of the IGBT and the diode. Conversely, an estimated diode junction temperature $T_{j,diode}$ is calculated according to $T_{j,diode}=T_{cool}+C3*P_{diode}+C4*P_{igbt}$, where C3 and C4 are additional constants associated with the thermal resistances of the IGBT and the diode.

In other words, as described above, the diagnostic module 148 is configured to calculate transistor and diode power losses based on measurable operating characteristics such as voltage, current, and switching frequency and estimate junction temperatures (which in turn are a function of increased resistance due to degradation) based on the power losses. Other operating characteristics include, but are not limited to, PWM characteristics, motor torque or speed, coolant temperature, etc. The diagnostic module 148 can then calculate health indicators HI for the inverter module 136 based on the estimated junction temperatures. More specifically, the diagnostic module 148 calculates the health indicators HI based on deviation from a relationship between the estimated junction temperatures and the sensed temperatures.

Although shown as a three-phase inverter, the inverter module 136 may be implemented as other types of inverters. Further, in some examples, the principles of the present disclosure may be implemented in other devices with a known relationship between measured and actual or estimated temperatures.

Figure 3:
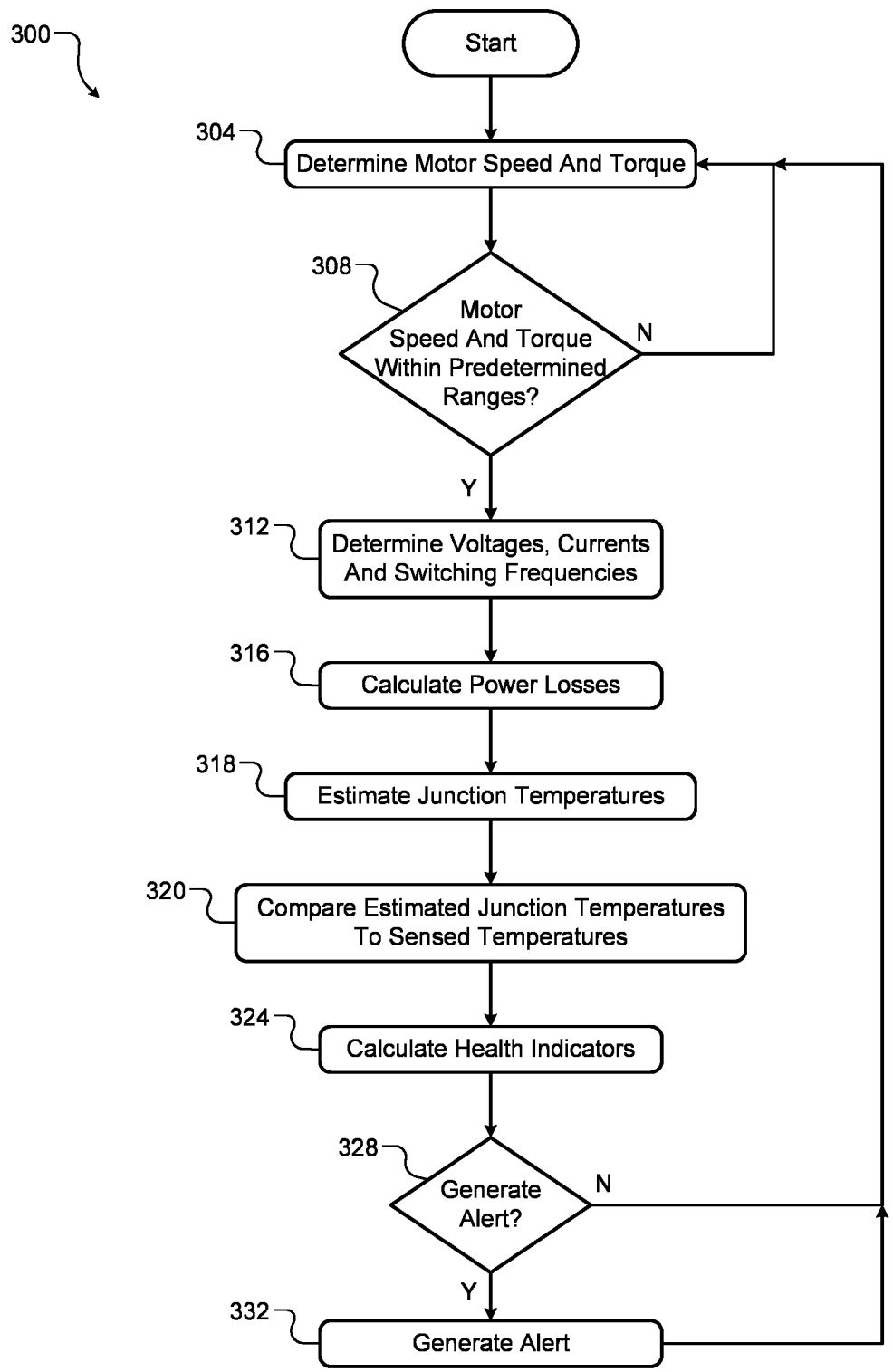
FIG. 3 illustrates steps of an example method of predicting degradation of an inverter module according to the present disclosure.

FIG. 3 shows an example method 300 for predicting degradation of the inverter module 136 according to the present disclosure. For example, the method 300 may be implemented within one or more of the motor control module 132, the diagnostic module 148, etc. At 304, the method 300 (e.g., the motor control module 132 determines motor speed and torque, and at 308 the method 300 determines whether the motor speed and torque are within predetermined ranges. The predetermined ranges may correspond to ranges of the motor speed and torque where subsequent measurements and calculations are more likely to be accurate. For example, motor speed and torque being too low or too high may interfere with accurate junction temperature estimation. If true, the method 300 continues to 312. If false, the method continues to 304.

At 312, the method 300 (e.g., the motor control module 132) determines voltages, currents, and switching frequencies of each of the legs 200 (i.e., as corresponding to different phases of the motor 128) of the inverter module 136. At 316, the method 300 (e.g., the diagnostic module 148) calculates power losses of the inverter module 136. For example, as described above, the diagnostic module 148 calculates transistor and diode power losses based on the voltages, currents, and switching frequencies. In some example, an overall inverter power loss may in turn be calculated based on individual power losses of the transistors and diodes in each of the legs 200.

At 318, the method 300 (e.g., the diagnostic module 148) estimates junction temperatures of each of the transistors and diodes based on the transistor and diode power losses as descried above. In some examples, the diagnostic module 148 may further calculate an average inverter junction temperature by averaging the individual estimated junction temperatures of each of the transistors and diodes. Separate health indicators may be calculated for individual components of the inverter module 136 and/or an overall health indicator may be calculated for the inverter module 136 based on the average inverter junction temperature.

At 320, the method 300 (e.g., the diagnostic module 148) compares the estimated junction temperatures to respective measured or sensed temperatures (i.e., temperatures sensed by sensors 260). At 324, the method 300 (e.g., the diagnostic module 148) calculates health indicators HI for the inverter module 136 based on a deviation from a relationship between the estimated junction temperatures and the sensed temperatures. For example, the diagnostic module 148 calculates separate health indicators for each IGBT junction and each diode junction of the inverter module 136.

As one example, each health indicator is an integer indicative of an amount of deviation (e.g., a difference) from a linear relationship between the estimated junction temperature and the sensed temperature. For example, the health indicator may be 1 when the sensed temperature is relatively close to an expected temperature for a given estimated junction temperature (i.e., the amount of deviation of the sensed temperature from the linear relationship is less than a first threshold). The health indicator may be 2 when the sensed temperature deviates further from the linear relationship (i.e., the amount of deviation of the sensed temperature from the linear relationship is greater than the first threshold but less than a second threshold that is greater than the first threshold). The health indicator may be 3 when the sensed temperature is still further from the linear relationship (i.e., the amount of deviation of the sensed temperature from the linear relationship is greater than the second threshold).

In other words, as the sensed temperatures increase at a rate that is greater than the expected linear relationship to the estimated junction temperatures, the corresponding health indicators increase to indicate a greater likelihood of degradation and failure of the inverter module 136.

At 328, the method 300 (e.g., the diagnostic module 148) determines whether to generate an alert based on the health indicators. For example, the diagnostic module 148 is configured to send no alert (e.g., if none of the health indicators are greater than 1) or different types of alerts (e.g., a first type of alert if only one of the health indicators is greater than 1, a second type of alert if any of the health indicators is greater than 2, etc.). If true, the method 300 continues to 332. If false, the method 300 continues to 304.

At 332, the method 300 (e.g., the diagnostic module 148) generates an alert. For example, if none of the health indicators is greater than 1, the diagnostic module may determine that there is minimal degradation of the inverter module 136 and no alert is necessary. Conversely, if one or more of the health indicators is 2 (i.e., estimated junction temperatures are increasing), the diagnostic module 148 may generate an alert indicating that the inverter module 136 is beginning to degrade and the driver should consider servicing the vehicle. If one or more of the health indicators is 3, the diagnostic module 148 may generate an alert indicating that the inverter module 136 is at risk of failure and should be replaced as soon as possible.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A diagnostic system for an inverter module, the diagnostic system comprising:
a motor control module configured to determine operating characteristics of the inverter module,
wherein the operating characteristics include of at least one of a voltage, a current, and a switching frequency associated with operation of the inverter module; and
a diagnostic module configured to:
receive the operating characteristics of the inverter module,
estimate at least one junction temperature of a component of the inverter module based on the operating characteristics,
calculate a health indicator of the inverter module based on (a) a linear relationship between the estimated junction temperature and a sensed temperature and (b) at least one temperature threshold,
wherein the health indicator is an integer indicative of an amount of deviation from the linear relationship between the estimated junction temperature and the sensed temperatures,
wherein as the sensed temperature increases at a rate that is greater than the linear relationship to the estimated junction temperature, the health indicator increases to indicate a greater likelihood of degradation and failure of the inverter module, and
selectively output an alert based on the calculated health indicator.

2. The diagnostic system of claim 1, wherein the diagnostic module is configured to estimate at least one of a transistor junction temperature and a diode junction temperature, and wherein the at least one junction temperature includes the at least one of the estimated transistor junction temperature and the estimated diode junction temperature.

3. The diagnostic system of claim 1, wherein the diagnostic module is configured to calculate at least one of a conduction loss and a switching loss of the component of the inverter module based on the operating characteristics.

4. The diagnostic system of claim 3, wherein the diagnostic module is configured to calculate a power loss of the inverter module based on the at least one of the conduction loss and the switching loss.

5. The diagnostic system of claim 4, wherein the diagnostic module is configured to estimate the at least one junction temperature based on the calculated power loss.

6. The diagnostic system of claim 1, wherein the diagnostic system is configured to selectively output the alert based on a value of the health indicator.

7. A vehicle comprising the diagnostic system of claim 1 and further comprising the inverter module and an electric motor.

8. A method for performing a diagnosis of an inverter module, the method comprising:
determining operating characteristics of the inverter module, wherein the operating characteristics include of at least one of a voltage, a current, and a switching frequency associated with operation of the inverter module;
estimating at least one junction temperature of a component of the inverter module based on the operating characteristics;
calculating a health indicator of the inverter module based on (a) a linear relationship between the estimated junction temperature and a sensed temperature and (b) at least one temperature threshold,
wherein the health indicator is an integer indicative of an amount of deviation from the linear relationship between the estimated junction temperature and the sensed temperatures,
wherein as the sensed temperature increases at a rate that is greater than the linear relationship to the estimated junction temperature, the health indicator increases to indicate a greater likelihood of degradation and failure of the inverter module; and
selectively outputting an alert based on the calculated health indicator.

9. The method of claim 8, further comprising at least one of estimating a transistor junction temperature and estimating a diode junction temperature, wherein the at least one junction temperature includes at least one of the estimated transistor junction temperature and the estimated diode junction temperature.

10. The method of claim 8, further comprising:
calculating at least one of a conduction loss and a switching loss of the component of the inverter module based on the operating characteristics;
calculating a power loss of the inverter module based on the at least one of the conduction loss and the switching loss; and
estimating the at least one junction temperature based on the calculated power loss.

11. The method of claim 8, further comprising selectively outputting the alert based on a value of the health indicator.

* * * * *